United States Patent [19]

Siems et al.

[11] 4,281,403
[45] Jul. 28, 1981

[54] SEISMIC DATA RECORDING METHOD AND APPARATUS

[75] Inventors: Lee E. Siems; James A. Porter, both of Houston, Tex.

[73] Assignee: Litton Resources Systems, Inc., Houston, Tex.

[21] Appl. No.: 74,587

[22] Filed: Sep. 12, 1979

[51] Int. Cl.³ .............................................. G01V 1/24
[52] U.S. Cl. ...................................... 367/76; 367/79; 370/103; 328/72
[58] Field of Search ............................ 367/55, 76, 79; 181/107; 370/102, 103, 108; 375/118; 307/269; 328/63, 72

[56] References Cited

U.S. PATENT DOCUMENTS

| | | | |
|---|---|---|---|
| 3,643,025 | 2/1972 | David et al. | 375/106 |
| 3,733,584 | 5/1973 | Pelton et al. | 367/77 |
| 3,806,864 | 4/1974 | Broding et al. | 367/79 |
| 3,825,899 | 7/1974 | Haeberle et al. | 370/102 |
| 3,946,357 | 3/1976 | Weinstein et al. | 367/77 |
| 3,962,634 | 6/1976 | Russo | 370/108 |
| 3,972,019 | 7/1976 | Bassett | 367/77 |
| 4,053,714 | 10/1977 | Long | 370/108 |
| 4,142,069 | 2/1979 | Stover | 370/103 |

OTHER PUBLICATIONS

Ibrahim et al. "A Comparison ... Shelf Zone," 4/78, pp. 514–527, Geophysics, vol. 43, #3.

Primary Examiner—Nelson Moskowitz
Attorney, Agent, or Firm—William A. Knox

[57] ABSTRACT

A decentralized seismic data recording system includes a central station and a plurality of remote seismic recording units that are incommunicado with the central station during a normal recording operation. A master clock is provided in the central station. A local clock is provided in each remote recording unit. At the beginning of a work period, the local clocks are synchronized with the master clock. Thereafter, a plurality of seismic data recordings are made. At the end of a work period, the time difference due to tuning drift between the master clock and each respective local clock is ascertained and is recorded. The time difference is linearly prorated over the recordings made during the work period, thereby synchronizing the time base of each seismic data recording with the master clock. Provision is made to validate each seismic data recording to prevent accidental recording of false data in event of a misfire or a non-fire of the seismic source.

21 Claims, 7 Drawing Figures

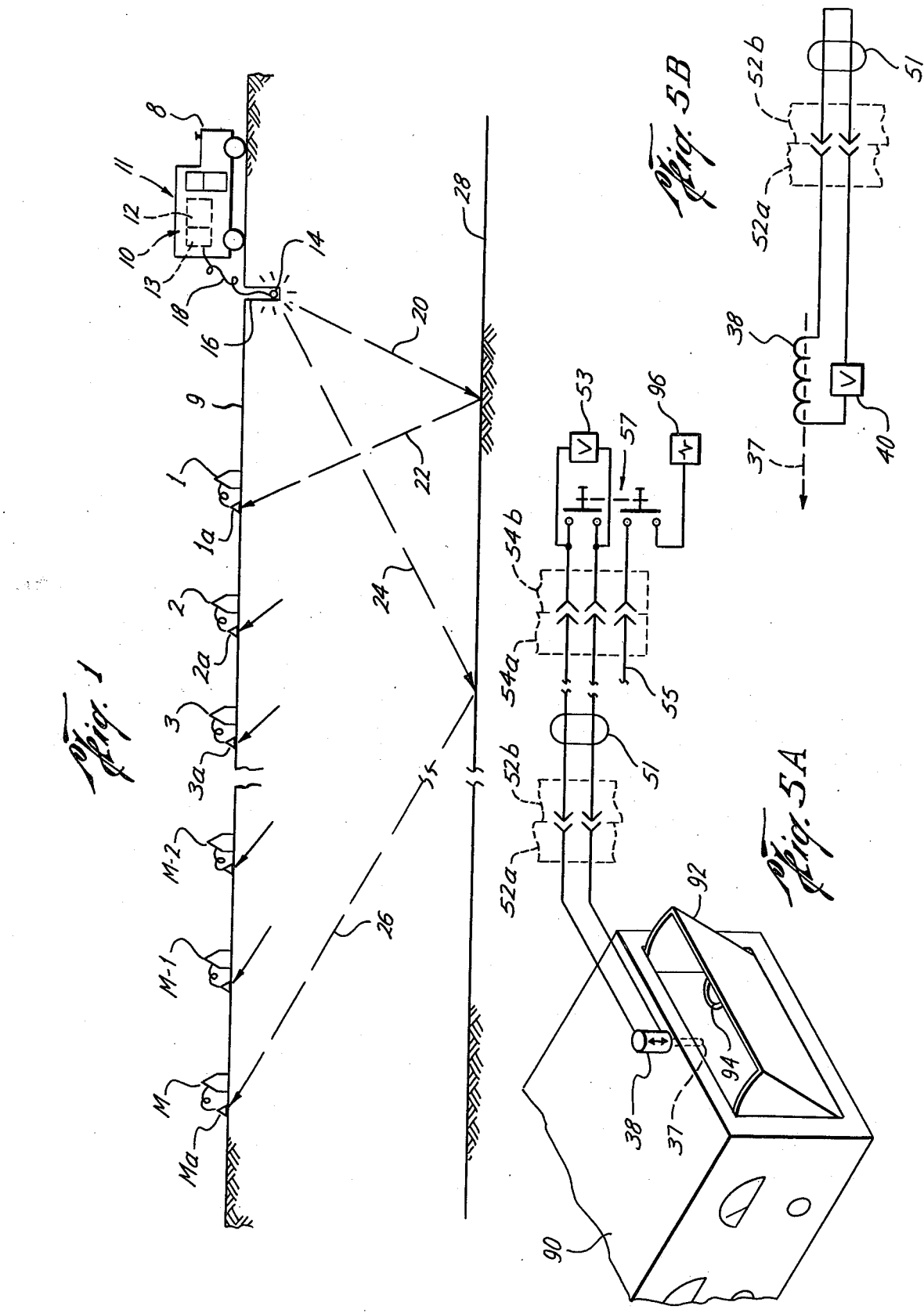

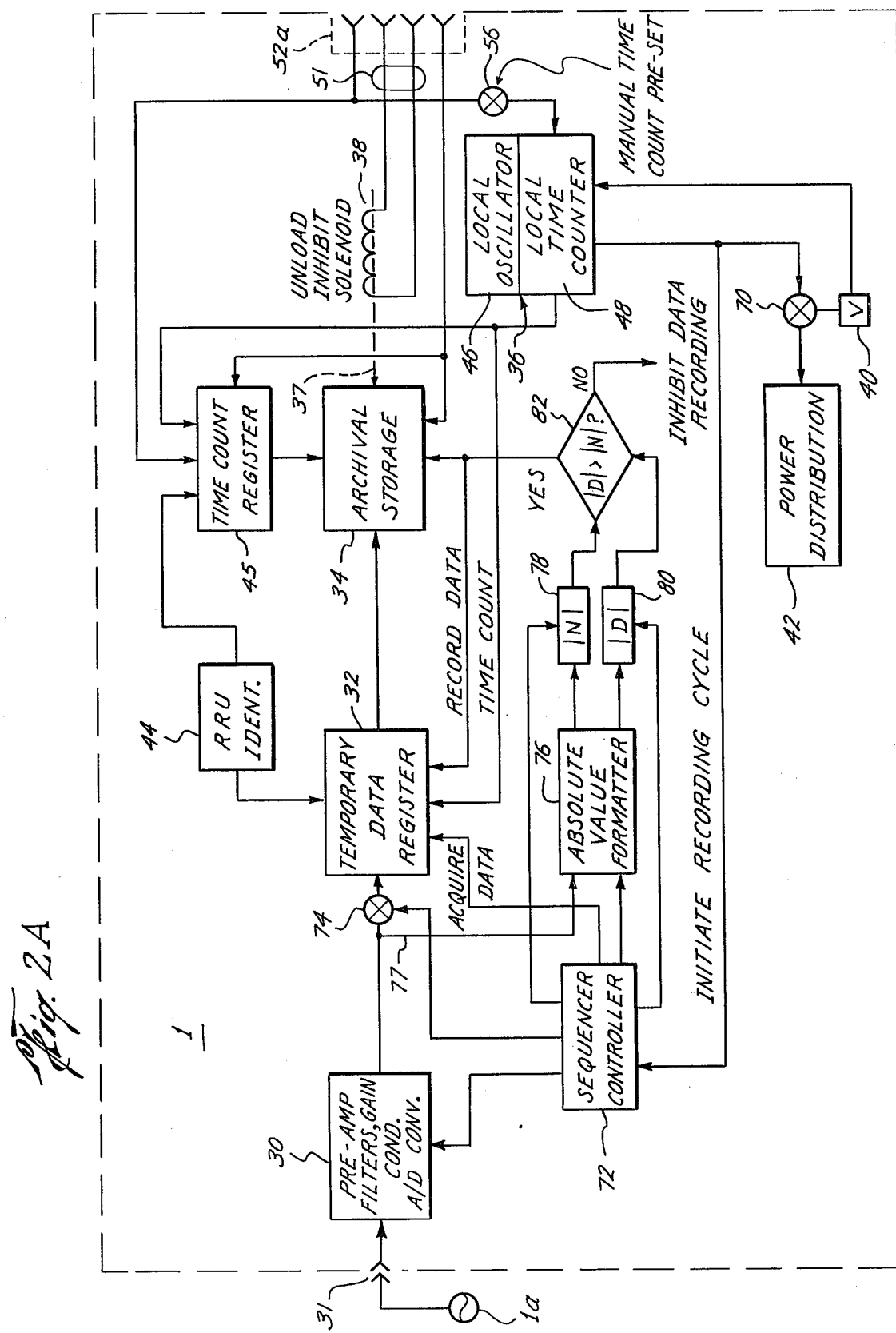

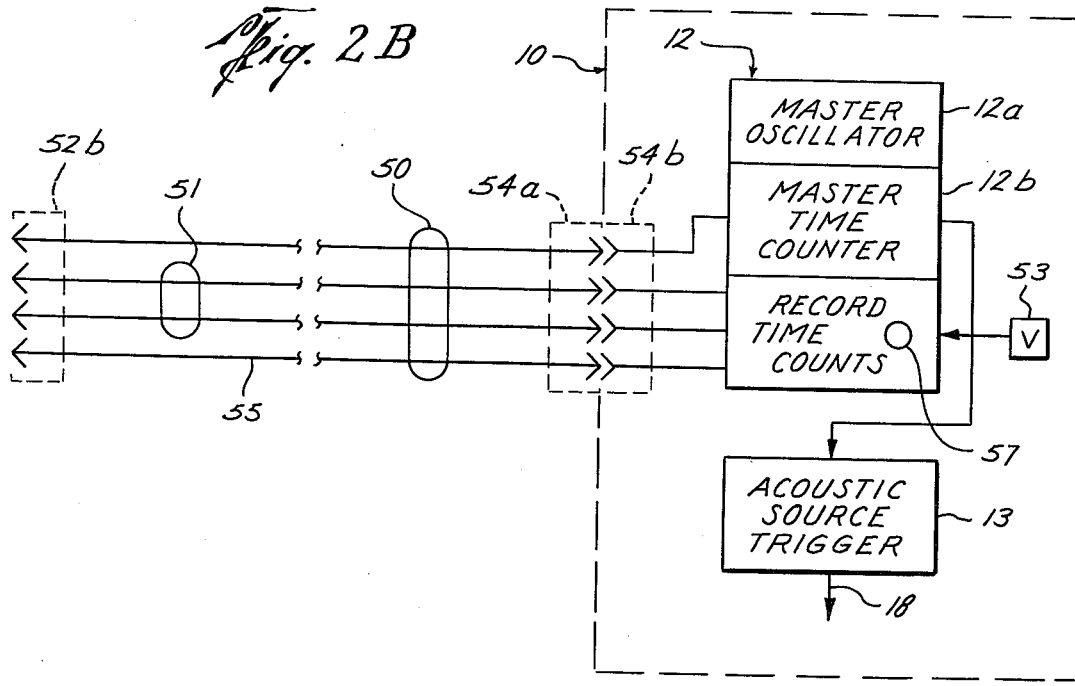
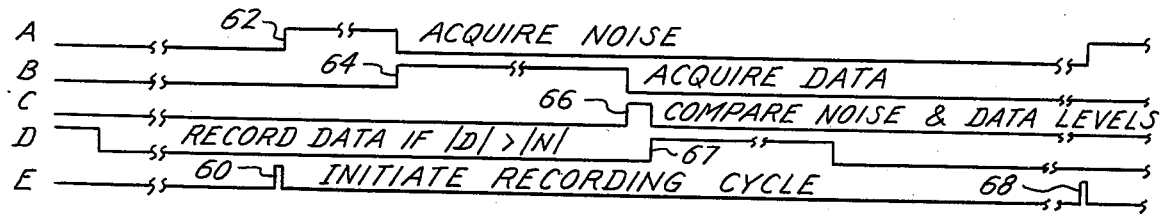
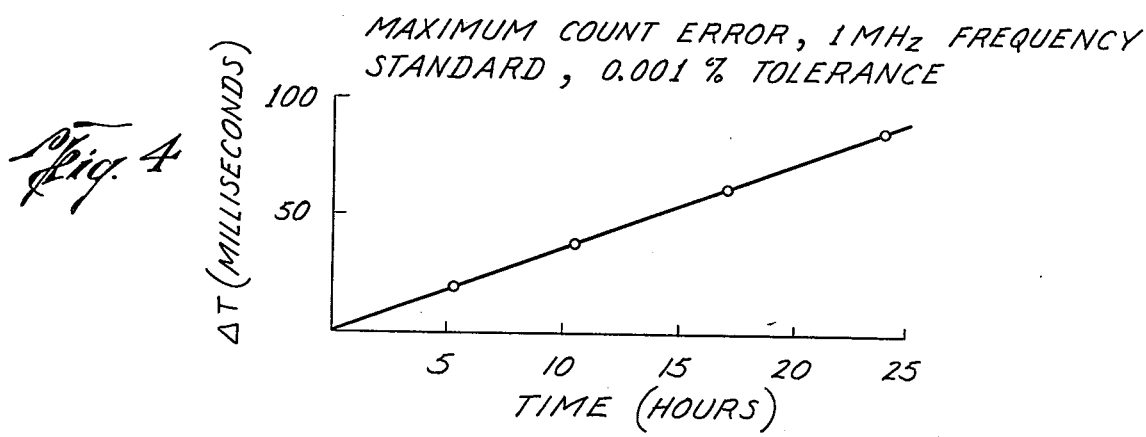

SEISMIC DATA RECORDING METHOD AND APPARATUS

BACKGROUND OF THE INVENTION

1. Field of the Invention

This invention relates to recording of seismic data by individual recording units located remotely from a central station.

2. Description of the Prior Art

During the course of seismic exploration, a plurality of seismic transducers or transducer groups are emplaced at desired intervals along a line of survey. The respective transducers are coupled to corresponding input channels of a multichannel recording system in a central station. The input channels include filters and signal-conditioning amplifiers. Signals from the transducers are processed through the input amplifiers, digitized and multiplexed to a recording medium such as magnetic tape. The transducer signals may be transmitted over land lines through a multiconductor cable wherein each transducer and corresponding input channel are interconnected by a dedicated wire pair. In another arrangement, the seismic signals are transmitted via a single-channel telemetric system using time division multiplexing. The transducers are generally spaced 200-300 feet apart. Up to 100 transducers and input channels may be used. Thus, several miles of cable must be laid out if land lines are used.

A number of systems are known or have been proposed to eliminate the need for the many miles of interconnecting cable. These systems either transmit seismic signals from the respective transducers to the central station by radio or the seismic signals are processed and recorded locally at each individual transducer, operating under radio commands from the central station. In such systems, some of the data-processing electronics are removed from the central station and installed in remote modules, one of which is associated with each of the transducers or transducer groups. The remote module may include a recording device such as a cassette tape for recording seismic signals resulting from several seismic shots during a recording period.

Representative known radio-controlled remote seismic data recorders are disclosed in U.S. Pat. Nos.: 3,062,315 to Herzog; 3,075,607 to Aitken et al; 3,283,295 to Montgomery; 3,288,242 to Loeb; 3,806,864, 3,987,406, and 4,010,442 all to Broding; 3,886,494 to Kostelnichek; 3,946,357 to Weinstein; and 4,042,906 to Ezell.

In the above-listed systems, selected units are turned on after receipt from the central station of a coded radio command. The coding determines the selection of the remote modules to be activated. To synchronize the various recorders, one with the other, and to provide accurate timing during a recording cycle, timing pulses are also transmitted to the remote modules. In some of the systems above, the recorded seismic data may be played back via radio to a master recorder in the central station for permanent storage. In others of the above systems, at the end of a recording period such as at the end of a day's work, the cassette tapes are harvested from the various recording modules and are played back either at the central recorder or in a data processing center.

The problems with the known art employing remote radio-controlled units are manifold. Each individual recording module must be separately addressed by a suitable radio code. This requirement necessitates complex coding-decoding circuitry in both the central station and in each individual module. The individual identification numbers of the respective modules must be recorded in the header of each seismic recording. If the data recorded at each module are to be played back over a radio link, then each module must play its data back in sequence because there are not available enough separate radio-channel frequencies to play back 100 recordings in parallel. Other remote playback techniques such as time-division or frequency-division multiplexing over a limited number of channels add extra complexity to the system. Furthermore, in known systems it is essential to transmit separate timing signals for accurate time synchronization of the remote recording modules, one with the other and with the central station. Additionally, many radio-controlled systems use radio frequencies that are effective only along line-of-sight. Therefore they are often not effective in mountainous or obstructed terrain, the very environment in which remote individual recording units are most useful. And finally, the requirement for at least a radio receiver, if not also a data transmitter, plus an antenna at each remote recording unit adds substantial complexity and bulk to the units.

SUMMARY OF THE INVENTION

It is an object of this invention to provide a decentralized seismic data recording system consisting of a central station and a plurality of remote recording units, each unit being associated with a single seismic transducer or transducer group. The units are independent of the central station during a working day in that they are not connected to the central station by either land lines or radio links. The units include a self-contained time counter and means for programming a plurality of recording cycles at desired intervals in synchronism with seismic shots fired by the central station although the units are incommunicado therewith.

In accordance with a preferred aspect of this invention, each hand-portable remote unit includes a resettable time counter. At the beginning of a recording period, such as a field working day, during which a plurality of recording cycles will be established, the local time counter in each remote unit is compared to the present value of the accumulated time count in a master clock time counter. The master clock may conveniently be located in the central station. At the end of the recording period, the local accumulated time count in each remote unit is again compared with the time count resident in the master clock time counter. The local accumulated time count as read from the respective remote-unit time counters and the accumulated time count of the master clock are separately recorded on special data files on the archival storage medium in each of the corresponding remote units. The difference in accumulated time between the local clock and the master clock may then be linearly pro-rated among all of the recorded data files for each of the remote units, thereby to synchronize them with the master clock and with each other.

In accordance with another aspect of this invention, the local time counter is reset to the present value of the accumulated time in the master time counter.

In an embodiment of this invention, the recording circuitry of the remote units, except for the time counter, remain inactive during most of the recording period. At selected intervals during a recording period, the time counter turns on the seismic signal detecting electronics in the remote units for the length of a desired recording cycle to record seismic signals.

In another embodiment of this invention the remote units are turned on for a predetermined time prior to the actual beginning of a proposed recording cycle to determine the average level of the ambient noise. At the end of a recording cycle, the average seismic signal level during the recording cycle is compared to the average ambient noise level. So long as the average seismic signal level during the recording cycle exceeds the ambient noise level by a predetermined amount, the recorded seismic signals are accepted as valid data and are transferred to an archival storage medium.

In yet another embodiment of this invention, the average ambient noise level is determined at the end of a recording cycle.

In accordance with an aspect of this invention, the prerecorded ambient noise signals and the recorded seismic signals are stored in a temporary storage prior to comparison. Following the comparison step, the seismic signals, if valid, are transferred to the archival storage medium. If the seismic signals are determined to be invalid, transfer is inhibited.

In accordance with another aspect of this invention, the archival storage medium of a recording unit is permanently locked therein until the accumulated time counts of both the remote unit and the master clock have been recorded as separate entries on the archival storage medium.

BRIEF DESCRIPTION OF THE DRAWINGS

The benefits and advantages of this invention will be better understood by reference to the detailed description and the accompanying drawings wherein:

FIG. 1 is a view of a typical field layout employing the teachings of this invention;

FIG. 2A shows a block circuit diagram of a remote recording unit;

FIG. 2B shows a block diagram of the circuitry in a central station;

FIG. 3 is a timing diagram of the sequence of system functions;

FIG. 4 is a graph of the relative tuning error between two oscillators; and

FIGS. 5 and 5b show means for inhibiting unloading of the archival storage medium from the remote module until the local and master time counts have been recorded.

DETAILED DESCRIPTION OF THE PREFERRED EMBODIMENT

Referring now to FIG. 1, a number of hand-portable remote recording units (RRU) 1, 2, ... M are deployed on the ground 9 along a seismic line of survey. Coupled to each RRU are one or more seismic transducers $1_a$, $2_a$, ... $M_a$ for detecting seismic signals. Within each RRU is circuitry for receiving and recording signals from the corresponding transducers. A crystal-controlled clock is installed inside each RRU. At selected intervals such as every five minutes during the course of a recording period which might comprise one working day, the RRUs are enabled to initiate a six- to eight-second listening and recording cycle. Seismic signals received during each recording cycle are monitored for validity and, if valid, are permanently recorded on an archival storage medium.

A central station 11 is provided. Central station 11 may be a vehicle 8 containing circuitry 10 including a master clock 12 and means 13 for triggering a seismic source. A common type of seismic source is an explosive charge 14 in a borehole 16 having an electrical detonator that is connected to trigger 13 by cable 18. Any other source such as a chirp signal generator, a gas gun, or an air gun could be used. At selected shot intervals during a recording period as determined by master clock 12, seismic source 14 is triggered. The seismic waves generated by the source travel along ray paths 20-22, 24-26 and, after reflection from a subsurface earth layer such as 28, are detected by the transducers such as $1_a$ through $M_a$.

It is necessary to synchronize the shot intervals at central station 14 with the initiation of the listening cycles in the RRUs which during normal seismic recording operations are incommunicado with respect to central station 11. Before the RRUs are deployed at the beginning of a work period, each RRU is individually connected to the master clock at the central station. The time count in the local RRU clock is reset to the exact time count of the master clock. Thereafter the RRUs may be distributed along the line of survey. At the end of the work period, the RRUs are returned to the central station. Each RRU is individually connected in turn to the master clock. The master time count and the local time count are then separately recorded in the RRU under comparison. When the data previously recorded in an RRU are dumped for later processing, the recorded count difference between local and master clocks is linearly prorated over each listening or recording cycle, thereby exactly synchronizing the shot intervals with the listening-cycle intervals in the various RRUs.

FIG. 2A shows the circuitry included within a typical RRU such as unit 1. An external transducer $1_a$ feeds seismic signals to signal processor 30 through connecting plug 31. Other principal components in the RRU are temporary data-storage register 32, archival storage 34, clock 36, unload-inhibit solenoid 38, power supply 40 such as a battery and power distribution circuitry 42.

Signal processor 30 includes a preamplifier, filters, gain-conditioning amplifiers and an analog-to-digital converter. These components are quite conventional. The received analog signals are processed, sampled, and converted to a digital representation of the amplitude and polarity of the analog signals. Any convenient digital number system may be used such as binary magnitude plus sign, floating point, etc.

Temporary data-storage register 32 stores seismic signal samples received during a recording or data acquisition cycle. The received signal samples are stored here, pending signal validation to be discussed below. Data register 32 may be any desired type of memory having a capacity sufficient to hold all of the signal samples from a single recording cycle. For a six-second record, sampled at 1 millisecond (ms) intervals for example, a capacity of at least 6000 data words is necessary.

A header block precedes the data that is acquired during each recording cycle to provide the identification number of the RRU. The identification may be entered at each RRU manually by the operator by use of a digital thumbwheel switch 44 of any conventional type. The RRU identification is available at temporary data-storage register 32 and time count register 45. The time count from clock 36 at the instant of initiation of a recording cycle is also entered in the header through register 32. In this disclosure, the words "time count" and "time" are synonomous.

Archival storage 34 is designed to receive and record valid data from temporary data-storage register 32. Removable storage 34 may conveniently be a digital-grade magnetic cassette type module or it may be a plug-in type, non-volatile memory module having sufficient capacity to store all of the seismic data samples that accumulate during the course of a recording or work period.

By way of example but not by way of limitation, use of a magnetic cassette type will be assumed. In the case of a magnetic tape, the data acquired during each recording cycle are recorded on tape as a separate data file as in conventional seismic operations.

Local clock 36 consists of two main parts, an oscillator 46 and a time counter or accumulator 48. A preferred oscillator is the model 1115 crystal oscillator made by Austron of Austin, Texas. This oscillator operates at 5 MHz and, for purposes of this disclosure, may be counted down to a desired count rate such as 1 KHz, thus providing a count every millisecond. Other count rates, corresponding to desired data-sampling rates could of course be used. The stability of the model 1115 oscillator depends upon such things as aging, supply voltage fluctuations, circuit loading and temperature variations. Typically, all else being constant the drift rate is $3 \times 10^{-9}$ per 24 hours after 72 hours of operation in the short term.

Time counter 48 as well as master time counter 12b (FIG. 2B) may be any well known presettable synchronous counter such as an SN74LS169 module made by Texas Instruments of Dallas, Tex. These counters are cascadable to provide the necessary number of bits to represent the maximum count expected during a normal work period. Over 24 hours, assuming 1-ms counts, the maximum count would be nearly $1 \times 10^9$ so that a 32-bit counter would be quite adequate.

Insofar as seismic operations are concerned, drift error due to temperature and aging is so miniscule as to be negligible. Of great importance however is the timing drift between any two oscillators due tuning error. Any one oscillator can be "tuned" or set within a precision of one part in $10^6$. Thus over a 24-hour period, assuming a 1-KHz count rate, the differential time error between two oscillators can be of the order of 100 milliseconds.

It would theoretically, of course, be possible to employ atomic clocks. The tuning error of such clocks is negligible insofar as seismic work is concerned. But atomic clocks are very expensive, consume an unacceptable amount of power and are far too bulky for use with portable RRUs. Hence, atomic clocks are impractical for field use. The lightweight, inexpensive crystal oscillator mentioned supra is preferred from a practical and economic standpoint.

The system of this invention includes a plurality of RRUs, each one having an oscillator or frequency standard that runs independently of the others. Hence, for useful results to be obtained, the accumulated time counts in the various RRUs must be reduced to a common time base. The required time base reduction is accomplished as follows.

At the beginning of a recording work day, each RRU is transported in turn to central station 11 (FIG. 1). By means of a jumper cable 50, FIGS. 2A and 2B, and suitable connector plugs 52a,b and 54a,b the time counter 12b of master clock 12 is coupled to the time counter 48 of local RRU clock 36. The master time count is available at the input of time count register 45 as is also the local time count of the RRU and the RRU ident. A manually-operated time-count reset switch 56 is pressed. Time accumulator 48 is thereby reset to the exact time count of the master clock 12. At the same time, by means of record-time pushbutton 57, a special pre-record file may be recorded on archival storage 34 by transferring the RRU ident and both the master time count and the local time count following the reset operation, from register 45 to the archival storage 34. Obviously, at the time of reset, the two recorded time counts must be identical. Of course, if desired, rather than resetting the local time counter, one could simply compare and record the difference between local and master time counts. Following the pre-record clock reset operation, jumper cable 50 is disconnected so that the RRUs may be deployed as desired with no further communication whatsoever between the RRUs and the central station until the end of a recording period.

At the end of a work period, the RRUs are brought back to the central station where the master time accumulator is coupled to the local time accumulator as before by jumper cable 50. By means of record-time-counts pushbutton 57, the local time count, the master time count and the RRU ident transferred from time count register 45 and are recorded as a separate post-record file as before. The difference between the two time counts is the relative timing error $\Delta T$, between local and master clocks distributed over the length of the work period, during which a plurality of data recordings were made. Note that at the end of the recording or work period, the manual reset 56 is not activated. If the local time-count reset option were not used, then of course the time count differences at the beginning and ending of a recording period could be recorded. From these differences, the relative timing error $\Delta T$ can easily be determined.

It has been found by tests that the relative timing error $\Delta T$ between any two clocks is substantially a linear function of duty time as shown in FIG. 4. Accordingly, the relative timing error may be removed from the individual data recordings by linearly prorating the error $\Delta T$ over the work period. Because the error is of the order of $10^{-6}$, the error during any one six-second data recording will be of the order of six microseconds and hence totally negligible. Only the start time or time of receipt of the seismic signals of each record need, therefore be corrected or altered. The proportioning of the tuning error to determine the time alteration for each start time is preferably accomplished at the time that the cassette tape is played back in a data processing center as part of the conventional statics and normal moveout application routine.

From the above discussion, it may be readily appreciated that it is essential that the actual time count of a local clock and the time count of the master clock (or the time count differences) be known and recorded at the end of a work period. If the two time counts were not available, it would be impossible to synchronize the two time bases and the recorded data would be useless. Therefore, means are provided to inhibit unloading of the archival storage medium unless the local and master time counts have been properly recorded. The storage medium, such as a cassette magnetic tape (not shown) fits in a compartment 90 (FIG. 5a) located in each RRU that is closed by an access door 92 having a magnetic latch 37. The access door cannot be opened unless the latch is disengaged from a catch 94 by unload-inhibit solenoid 38. In turn, solenoid 38 cannot be actuated unless jumper cable 50 is plugged in and record-time-counts button 57 is depressed. Button 57 serves the dual purpose of (1) sending a record pulse from a suitable pulse generation circuit 96 over line 55 to storage 34 and register 45 and (2) of applying power to solenoid 38 over conductor pair 51 from power supply 53. Alternatively as in FIG. 5b, power from local power supply 40 could be connected in series with solenoid 38. Conductors 51 in jumper cable could be shorted out. Insertion of plug 52b into plug 52a would then complete the solenoid circuit through the shorted conductor pair 51.

Having considered the major RRU components and timing synchronization, let us turn our attention to the detailed operation of the data recording system as shown in FIGS. 2A, 2B and 3. Time counter 12b, part of the master clock 12, is designed to furnish a signal that enables the operator to trigger seismic source 14, at selected shot intervals. A seismic pulse may therefore not be initiated except at one of the preselected times during the work period. Time counter 48 in a typical RRU initiates a recording cycle at recording intervals corresponding to the shot intervals. The intervals may be operator selectable and typically might range from one to five minutes apart. A recording cycle is enabled at the beginning of each interval. FIG. 3 is a timing diagram of the sequence of events in an RRU between two recording intervals. A pulse 60, trace E from time counter 48 initiates a recording cycle consisting of a noise acquisition phase as indicated by enable pulse 62, trace A, about ½ to 1 second long; a data acquisition phase about 6 seconds long, as shown by enable pulse 64, trace B; a data validation phase, as represented by enable pulse 66 that is a few microseconds long, trace C; and a data recording phase, initiated by enable pulse 67, trace D. Enable pulse 67 may be substantially shorter than the data recording phase provided that data recording can be done at a rate that is faster than real time. The trailing edge of enable pulse 67 places the system on standby until the next recording-cycle initiation of a pulse 68.

Pulse 60 enables the system from a standby state by closing switch 70 to apply power to the system and by activating sequencer-controller 72. Power is, of course, always furnished to clock 36. Sequencer 72 thereafter controls the remaining system functions in the proper order.

During the pre-record noise acquisition period, signal processor 30 accepts and processes ambient noise signals. Switch 74 is opened so that nothing is sent to temporary data storage register 32 but the signals representing ambient noise are sent to absolute value formatter 76 over line 77. Assuming that the digital signal samples from processor 30 are expressed as magnitude plus sign, formatter 76 strips the sign from each signal sample and accumulates the sum of all of the samples acquired during the noise acquisition phase. At the end of the noise acquisition phase, the accumulated sum is divided by the number of samples to obtain the average absolute magnitude $|N|$. The average absolute noise magnitude is transferred to a holding register 78. Formatter 76 may conveniently be a 4-bit cascadable serial binary accumulator and shift register such as the SN74S281 integrated circuit chip made by Texas Instruments Inc. Sufficient chips are cascaded to provide capacity to accumulate the largest expected sum. At the end of the noise acquisition phase, division is accomplished by an n-bit binary right shift, where n is a function of the number of accumulated samples. For example, if there are 512 samples (½ second at a 1-ms sample interval), a 9-bit right shift is required.

Upon completion of the noise acquisition phase, sequencer 72 initiates a data acquisition phase. At this time, switch 74 is closed and signal data samples are directed into both temporary data storage register 32 and into formatter 76 in parallel. At the beginning of data acquisition the current local time count is entered along with the RRU ident as a header entry in register 32. Header and data samples are held temporarily in register 32 until after the data validation phase. In formatter 76, the average absolute magnitude $|D|$ of the data samples for a preselected interval such as two or more seconds is computed in register 80 which is a counterpart of register 78.

At the end of the data acquisition phase, sequencer 72 transfers $|N|$ and $|D|$ to a comparator 82. If $|D|$ exceeds $|N|$ by a predetermined amount such as 6 dB, the recorded data are considered to be valid and comparator 82 causes register 32 to transfer its contents to archival storage 34 where the data samples are recorded as a data file. If $|D| \leq |N|$, that is if the average absolute amplitude level of the supposed data signal is not substantially greater than the level of the ambient noise, it is assumed that no shot was fired or that a misfire occurred at the central station for that recording interval and so no data-sample transfer is made. Upon completion of the data recording phase, the system reverts to standby, to conserve power, until the next recording interval.

It will be remembered that a noise acquisition phase immediately precedes the data acquisition phase of the recording cycle. Accordingly, time counter 48 may be set to initiate a recording cycle one-half to one second ahead of the expected shot time. Alternatively the recording and shot intervals may be set indentically in time counters 48 and 12b, but a delay line is inserted between time counter 12b and seismic source trigger 13. Such a delay line would delay triggering the seismic source until the end of the noise acquisition phase. In another operational sequence, the noise acquisition phase could immediately follow, rather than precede, the data acquisition phase so that each recording cycle would start at the time the acoustic source is triggered.

As described above, over a period of 24 hours or so, the cumulative tuning error may cause one or more of the RRU clocks to run fast or slow relative to the master. To avoid missing a shot, a pad of several tens or hundreds of milliseconds may be added to the beginning of the noise acquisition phase and the data acquisition phase may be lengthed by an equal amount to insure that no data is lost.

The above embodiment is described in terms of exemplary components which in no way limits the scope of this invention which is limited only by the appended claims. For example, the master clock as above described simply counts elapsed time from an arbitrarily chosen instant. As an obvious variant the clock could be configured to provide Julian date and time of day. Means could be provided to assign an ordinal number to each seismic source triggering cycle during a recording period, correlating same with the time of day. These data could be recorded on an auxiliary archival storage medium such as a magnetic tape associated with the master station (not shown in the Figures).

We claim as our invention:

1. A seismic data acquisition system comprising:
   a central station including a master clock;
   a plurality of remote recording units for receiving and recording seismic signals as a function of time during a recording period when the remote recording units are incommunicado with respect to the central station;
   a local clock associated with each remote recording unit;
   means for determining by direct comparison the relative time errors that accumulate between the master clock and each local clock during the recording period
   means responsive to the relative determined time errors for determining the pro rata portion of the time error associated with the time of each enablement of each remote recording unit
   apportioning a pro-rata portion of the respective accumulated time errors associated with each said local clock to the initiation time of each recording cycle.

2. The system of claim 1, further comprising:
   a seismic source selectively operable during desired time intervals under control of the master clock during the recording period; and
   means under control of the local clocks for enabling the remote recording units substantially concurrently with the expected operation of the source.

3. The system of claim 1 or 2, wherein the means for determining the relative time errors, comprises:
   means operable before the recording period for adjusting each local clock according to the master clock; and means operable after the recording period to determine the time difference between the master clock and each local clock.

4. The system of claim 1 or 2, wherein the means for determining the relative time error, comprises:
   means for determining the time difference before and after the recording period between the master clock and each local clock.

5. The system of claim 2, further comprising:
   means for altering the time function of at least one of the recorded seismic signals in accordance with the determined relative time error.

6. The system of claims 1 or 2, wherein the remote recording units further include:
   means for validating received seismic signals; and
   means for recording seismic signals so validated.

7. The system of claim 6, wherein the validating means includes:
   means for comparing the seismic signals received during the expected operation of the source and seismic signals received at other times.

8. The system of claim 7 wherein the comparing means includes:
   means for comparing the absolute average magnitudes of the seismic signals to determine the ratio therebetween; and
   means to accept as valid a seismic signal received during expected operation of the source when the radio exceeds a predetermined value.

9. The system of claim 6 wherein the validating means includes:
   means for validating seismic signals when the average absolute amplitude of the seismic signals exceeds the average absolute amplitude of the ambient noise near the time of receipt of the seismic signal.

10. The system of claim 1 or 2, wherein the remote recording units include a storage medium for recording the seismic signals and the system further comprises:
    lockin means for preventing removal of the archival storage media from their respective remote recording units until the means for determining the relative time error has been activated.

11. The system of claim 2, comprising:
    means for activating the seismic source during a portion of the desired time interval when the remote recording units are all enabled irrespective of any difference in times between the local clocks and the master clock.

12. A seismic data acquisition system comprising:
    a central station having a master clock;
    a plurality of remote recording units that are incommunicado relative to the central station during a recording period;
    at least one seismic sensor coupled to each said remote recording unit;
    means in each said remote recording unit to receive and record seismic signals from said seismic sensor;
    a local clock associated with each remote recording unit;
    means for adjusting the time of each said local clock to the time of said master clock prior to a recording period;
    a seismic source;
    means for activating, during the recording period, said seismic source at a plurality of selected time intervals, according to said master clock;
    means for initiating a corresponding plurality of seismic data recording cycles in each said remote recording unit according to the respective local clocks; and
    means for measuring and recording the relative time differences by direct comparison between said master clock and each said local clock at the end of the recording period to determine the relative time differences accumulated during the recording period;
    means responsive to the relative determined time errors for determining the pro rata portion of the time error associated with the time of each enablement of each remote recording unit
    apportioning a pro-rata portion of the respective accumulated time errors associated with each said local clock to the initiation time of each recording cycle.

13. A method of acquiring seismic data comprising the steps of:
    positioning along a line of seismic survey a plurality of independent remote recording units, each associated with a local clock and a seismic signal sensor;
    disposing a central station, having a master clock, at a desired seismic source location;
    adjusting the time according to each local clock to the time according to said master clock prior to a recording period;
    repeatedly activating a seismic source during a recording period at desired shot intervals according to said master clock;
    recording, at each said remote recording unit, the seismic signals received by the associated seismic sensor due to each activation of said seismic source and the time of arrival of said signals according to said associated local clock; and adjusting the time of arrival of said seismic signals at a particular remote recording unit in response to a particular seismic-source activation, in accordance with any time difference between said master clock and the local clock associated with a particular remote recording unit means responsive to the relative determined time errors for determining the pro rata portion of the time error associated with the time of each enablement of each remote recording unit apportioning a pro-rata portion of the respective accumulated time errors associated with each said local clock to the initiation time of each recording cycle.

14. The method according to claim 13 including the further steps of:

comparing, at the end of said recording period, the master clock time with each said local clock time to determine an individual time difference for each said local clock; and recording said time difference at the respective associated remote recording units.

15. The method according to claim 14 including the further steps of:

activating the remote recording units only during preselected recording cycles according to the respective associated local clocks; and activating said seismic source according to said master clock, only during that portion of such recording cycles as are common to all remote recording units regardless of any time difference between the local clocks and the master clock.

16. The method according to claim 15 including the step of:

validating, at each remote recording unit, the received seismic signals before recording same.

17. The method according to claim 16 wherein the step of validation includes the steps of:

comparing the average absolute amplitude of the ambient noise near the time of a recording cycle with the average absolute amplitude of the seismic signals received during a recording cycle, the received seismic signals being considered valid when the average signal level exceeds the average noise level by a preselected ratio.

18. The method according to claim 17 wherein the preselected ratio is at least 2:1.

19. A method of seismic data acquisition comprising the steps of:

locating a central station having a master clock associated therewith, at a desired location;

disposing a plurality of independent remote recording units along a desired line of survey, a local clock and a seismic sensor being associated with each said remote recording units;

initiating, at timed intervals according to the local clocks, a plurality of recording cycles in each said remote recording unit during a recording period; and determining the relative time errors, between the master clock and the respective local clocks, that accumulated during the recording period means responsive to the relative determined time errors for determining the pro rata portion of the time error associated with the time of each enablement of each remote recording unit apportioning a pro-rata portion of the respective accumulated time errors associated with each said local clock to the initiation time of each recording cycle.

20. The method of claim 19 comprising the further steps of:

validating the seismic signals received during each recording cycle before recording same.

21. The method of claim 19 comprising the further step of:

activating a seismic source at timed intervals according to said master clock during a portion of the recording-cycle initiation-time intervals when a recording cycle has been initiated in all of the remote recording units regardless of any time difference between the local clocks and the master clock.

* * * * *